United States Patent [19]

Chainer et al.

[11] Patent Number: 4,630,941
[45] Date of Patent: Dec. 23, 1986

[54] TUBULAR SQUEEZE BEARING APPARATUS WITH ROTATIONAL RESTRAINT

[75] Inventors: Timothy J. Chainer, Mahopac; Robert A. Scranton; David A. Thompson, both of South Salem, all of N.Y.

[73] Assignee: International Business Machines Corp., Armonk, N.Y.

[21] Appl. No.: 790,650

[22] Filed: Oct. 24, 1985

Related U.S. Application Data

[63] Continuation of Ser. No. 581,748, Feb. 21, 1984, abandoned, which is a continuation-in-part of Ser. No. 470,658, Feb. 28, 1983.

[51] Int. Cl.⁴ .............................................. F16C 32/06
[52] U.S. Cl. ............................................. 384/1; 384/7
[58] Field of Search .............. 308/1 R, 3 R, 3 A, 5 R; 384/114

[56] References Cited

U.S. PATENT DOCUMENTS

| | | | |
|---|---|---|---|
| 2,458,934 | 1/1949 | Everett | 65/110 |
| 2,545,728 | 3/1951 | Everett | 65/110 |
| 3,008,336 | 11/1961 | Leduc | 308/1 R X |
| 3,028,693 | 4/1962 | Malzahn | 308/3 R X |
| 3,141,754 | 7/1964 | Blackman | 65/277 |
| 3,239,283 | 3/1966 | Broeze et al. | 384/129 |
| 3,339,421 | 9/1967 | Warnock | 74/5 |
| 3,359,045 | 12/1967 | Hsu | 308/1 R |
| 3,363,300 | 1/1968 | Stec | 29/149.5 A |
| 3,471,205 | 10/1969 | Farron et al. | 384/107 |
| 3,520,197 | 7/1970 | Blanding et al. | 308/1 R X |
| 3,539,322 | 11/1970 | Curtis | 65/108 |
| 3,620,707 | 11/1971 | Van Damme | 65/271 |
| 3,805,552 | 4/1974 | Heald | 308/3 R X |

FOREIGN PATENT DOCUMENTS 0067317  5/1982  European Pat. Off. ............ 308/6 C

OTHER PUBLICATIONS

"Fabrication of a Travelling Wave Tube Envelope", by John Roushey, 18th Symposium on the Art of Glassblowing, 1973.

Salbu, "Compressible Squeeze Films and Squeeze Bearings," International Business Machines Corp., *Transaction of ASME Journal of Basic Engineering*, Jun. 6, 1964.

*Primary Examiner*—Stuart S. Levy
*Assistant Examiner*—Joseph J. Hail, III
*Attorney, Agent, or Firm*—Pollock, Vande Sande & Priddy

[57] ABSTRACT

An improved squeeze bearing apparatus exhibits torsional stiffness or rotational restraint since its rod-like bearing member (22) and its sleeve-like bearing member (28) comprise non-circular perimeters (26,32).

39 Claims, 25 Drawing Figures

TUBULAR SQUEEZE BEARING APPARATUS WITH ROTATIONAL RESTRAINT

CROSS-REFERENCE TO RELATED APPLICATION

This is a continuation of co-pending application Ser. No. 581,748 filed on Feb. 21, 1984 now abandoned, which is a continuation in part of Ser. No. 470,658 filed Feb. 28, 1983, for Sleeve-Type Squeeze Bearing System Having Rotational Constraint.

DESCRIPTION

1. Technical Field

The present invention is concerned in general with bearings which permit relative linear motion between a pair of bearing members. More particularly, the invention is concerned with a tubular squeeze bearing apparatus in which relative radial vibration is induced between a rod-like bearing member and a surrounding sleeve-like bearing member to compress and decompress a thin film of gas or liquid between the bearing members and create a squeeze-bearing effect which permits nearly frictionless relative movement of the bearing members.

2. Background Art

The general theory of the operation of squeeze type bearings has been well documented in the prior art. For example, an article entitled "Compressible Squeeze Films and Squeeze Bearings" by E. O. Salbu in the June 6, 1964 issue of the *Transactions of the ASME, Journal of Basic Engineering*, is an excellent basic reference for an understanding of the squeeze bearing principle. Since the publication of this article, a variety of bearing arrangements have been proposed and used which rely on the basic squeeze bearing principle.

Recently, tubular or cylindrical squeeze bearing apparatuses have been suggested as the appropriate bearing member to be used for the magnetic transducer carriage assemblies of the transducer positioning systems used in magnetic disk data storage files. The function of such positioning systems is to move the magnetic transducer quickly and accurately to a position opposite a specific track on a magnetic disk. The positioning operation involves linear movement of the magnetic transducer head over a range of travel of about one to two inches, with very high accuracy. The transducer head is mounted on an arm which is generally attached to the movable coil of a voice coil actuator. The coil and arm are attached to a carriage assembly which functions to precisely guide the head and coil as they are moved along a linear path between tracks. The distance between the head and the disk must be accurately controlled since this distance is critical to successful writing of data on and reading of data from the disk. It is also important that the recording gap of the magnetic head assume a constant angle to the center line of the track if data is to be read and written accurately.

Prior art tubular type squeeze bearing apparatuses generally permit the necessary single degree of translatory movement across a disk without substantial static friction problems; however, it has been found that substantial modifications to such apparatuses are necessary to impose a certain rotational or torsional stiffness on the bearing and to improve the pitch and yaw characteristics of the bearing.

Figures 1, 2:
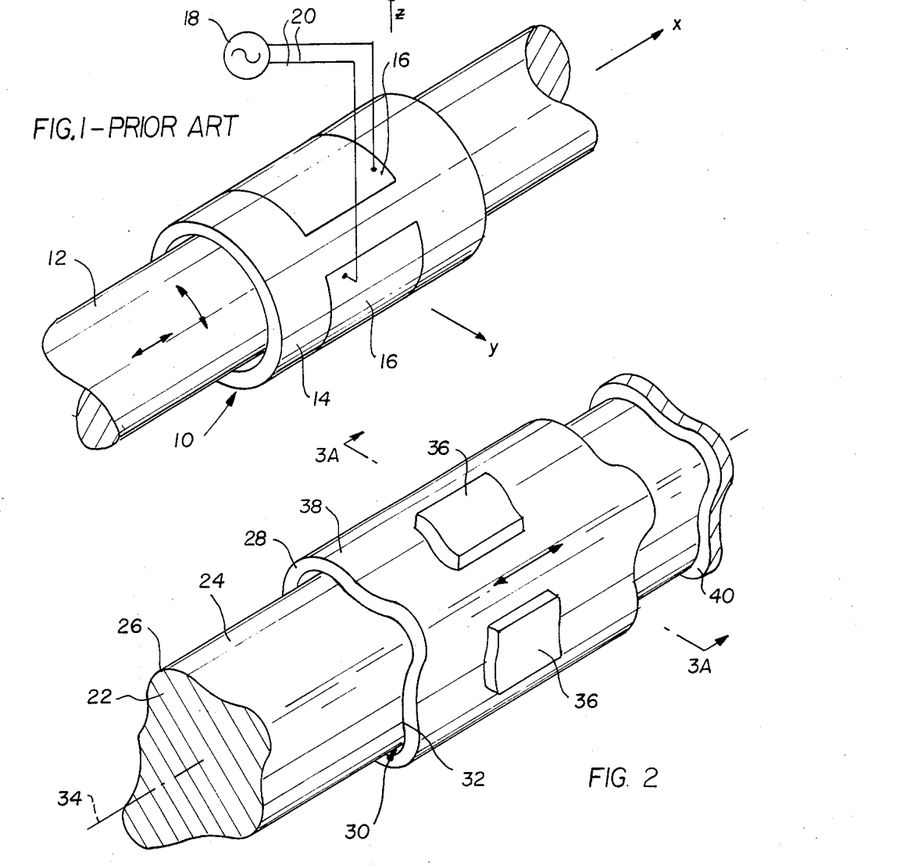
FIG. 1 shows a perspective view of a prior art squeeze bearing apparatus.
FIG. 2 shows a perspective view of a general case of a squeeze-bearing apparatus embodying the present invention.

FIG. 1 of the present application shows a perspective view of a squeeze bearing 10 of the type known in the prior art. Such a bearing has comprised a rod-like bearing member 12 of right circular cylindrical configuration which may be made from a suitable material such as stainless steel. Surrounding bearing member 12 is a sleeve-like bearing member 14 which may be made from a tube of piezoelectric material such as lead zirconate titanate ceramic (PZT) supported on an inner tube of molybdenum to form a bender element transducer. In a typical application, the radial clearance between bearing members 12 and 14 would be approximately 0.001 centimeter. A pair of metallic film electrodes 16 are applied to the exterior surface of sleeve-like bearing member 14 and connected to a source of alternating electrical power 18 by means of suitable conductors 20 in the familiar manner. When power source 18 is activated, sleeve-like bearing member 14 oscillates radially in and out so that the air or other gas or liquid in the small annular space between bearing members 12 and 14 is alternately compressed and decompressed to produce the well known squeeze bearing effect. Such bearings are stable against displacement along the illustrated Y and Z axes, against yaw about the Z axis and against pitch about the Y axis. They permit relative translation of bearing members 12 and 14 along the X axis but, unfortunately, also permit relative rotation or roll of member 12 and 14 about the X axis.

When such prior art squeeze bearings are used to mount a carriage for the read-write heads in a magnetic disk data storage file, it is highly desirable that the carriage for the read-write heads be able to move very accurately over a limited range and that the read-write heads remain in an essentially constant plane close to and parallel with the surface of the disk. Thus, it is desirable to prevent roll of the bearing members supporting the read-write heads about their axis of translation. Various techniques have been developed for achieving this goal. Typically, such prior art techniques have involved the use of rather complex combinations of spaced cylindrical and flat squeeze bearings or conventional bearings. So, a need has continued to exist for a simple, very low friction squeeze bearing apparatus which has rotational or torsional stiffness.

SUMMARY OF THE INVENTION

An object of the present invention is to provide an improved squeeze bearing apparatus having a rotational restraint which virtually eliminates relative roll between the rod-like and sleeve-like bearing members.

Another object of the invention is to provide such a squeeze bearing apparatus in which the necessary relative radial vibration between the bearing members can be established using piezoelectric, elelctrostrictive, magnetostrictive or electromagnetic transducers.

Yet another object of the invention is to provide such a squeeze bearing apparatus in which only a single rod-like bearing member and a single sleeve-like bearing member are required to provide the desired squeeze bearing effect and the desired rotational restraint or stiffness.

These objects are given only by way of illustrative examples; thus, other desirable objectives and advantages inherently achieved by the disclosed invention may occur or become apparent to those skilled in the art. Nonetheless, the scope of the invention is to be limited only by the appended claims.

Applicants have discovered that a significant degree of the desired torsional stiffness can be achieved if the rod-like bearing member has an at least partially cylindrical exterior surface with a non-circular exterior perimeter and the sleeve-like bearing member has an at least partially cylindrical interior bore with a non-circular interior perimeter.

In this specification, the terms "cylinder" and "cylindrical" refer to a surface traced by any straight line moving parallel to a first straight line and intersecting a fixed closed curve. Such a curve need not be circular for a true cylinder to be defined. Of course, those skilled in the art will appreciate that the exterior surface of the rod-like bearing member and the interior surface of the sleeve-like bearing member need not be perfectly cylindrical at all locations around their perimeters, as will be discussed further in this specification.

The improved squeeze bearing apparatus according to the invention comprises a sleeve-like bearing member having an at least partially cylindrical interior bore with a first non-circular interior perimeter and an axis extending through the bore. A rod-like bearing member extends through the interior bore of the sleeve-like bearing member and comprises an at least partially cylindrical exterior surface having a second non-circular exterior perimeter. Means such as at least one piezoelectric transducer mounted on or comprising part of either the sleeve-like bearing member or the rod-like bearing member, are provided for causing sufficient relative radial vibration between the sleeve-like bearing member and the rod-like bearing member to cause the fluid in the clearance between the bearing members alternately to be compressed and decompressed. As a result, a load supporting force is generated in the squeeze bearing defined between the bearing members. Significantly, due to the non-circular perimeters of the bearing members, relative rotation between the bearing members about their common axis is resisted.

As used in this specification, the term "non-circular perimeter" means that the inner perimeter of the sleeve-like bearing member and the outer perimeter of the rod-like bearing member are so configured that relative rotation between the bearing members of more than a fraction of a degree is prevented.

Depending upon the desired application of a squeeze bearing apparatus according to the invention, either the sleeve-like bearing member or the rod-like bearing member may be fixed and the other bearing member may translate in use. The sleeve-like bearing member may be made in part from a piezoelectric material. The rod-like bearing member may be formed from a solid block of piezoelectric material or may be hollow and provided with piezoelectric transducers on its interior surfaces. In some embodiments, both the sleeve-like bearing member and the rod-like bearing member may be formed at least in part from piezoelectric material and driven at the same or different frequencies.

In the preferred embodiment of the invention, the perimeters of the rod-like and sleeve-like bearing members preferably are equally spaced from each other all around. However, applicants have also found that a sufficient squeeze bearing effect is produced and good rotational stiffness is achieved if these perimeters together comprise a plurality of juxtaposed, perimetrically extended pairs of segments having essentially geometrically similar shapes, the transducer elements being at such segments so that relative radial vibration occurs primarily between such segments in order to generate local supporting forces and resist relative rotation of the bearing members. As used in this specification, the terms "geometrically similar" indicate that one closed curve and another closed curve or one segment of a curve and another segment of a curve are essentially identically shaped but differ in overall size or position.

In addition to the preferred use of piezoelectric transducers, it is also within the scope of the invention to provide the necessary relative vibration using electrostrictive, magnetostrictive and electromagnetic transducers. The presently preferred configuration for the bearing members is square or rectangular; however, it is within the scope of the invention to provide bearing members having rather arbitrary perimeters as well as bearing members having oval, oblong, rectangular, triangular, hexangular, pentangular, D-shaped and other non-circular perimeters.

BRIEF DESCRIPTION OF THE DRAWINGS

The foregoing and other objects, features and advantages of the invention will be apparent from the following more particular description of the preferred embodiments of the invention, as illustrated in accompanying drawings.

As previously indicated,

FIG. 13A shows a sectional view along line 3A—3A of FIG. 2.

FIG. 3B shows a sectional view through another general case of a squeeze bearing apparatus according to the invention in which the rod-like bearing member is hollow and the transducers are mounted on its interior surface.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Figures 3A, 3B:
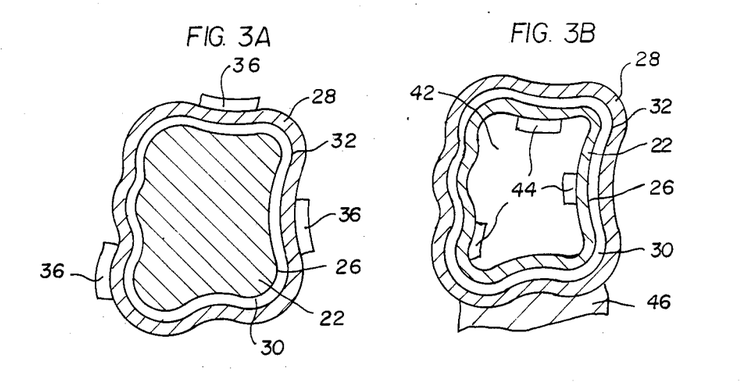

FIG. 2 and FIGS. 3A–3B illustrate general cases of a squeeze bearing apparatus according to the invention. A rod-like bearing member 22 is provided with a cylindrical exterior surface 24 having an arbitrary, non-circular exterior perimeter 26. Slidably mounted on rod-like bearing member 22 is a sleeve-like bearing member 28 having a cylindrical interior bore 30 with a non-circular interior perimeter 32. Preferably, interior perimeter 32 is geometrically similar to exterior perimeter 26. As indicated in FIG. 2, bearing members 22 and 28 have a common longitudinal axis 34. As indicated in FIG. 3A, the radial clearance between the bearing members preferably is equal all around.

Although a single piezoelectric transducer can be used, it is preferred to provide a plurality of transducers 36 bonded to the exterior surface 38 of bearing member 28 as shown in FIGS. 2 and 3A. In the illustrated example, rod-like bearing member 22 is fixed to a suitable base 40. However, it is also within the scope of the invention to fix the sleeve-like bearing member 28 and allow the rod-like bearing member 22 to translate as shown, for example, in the embodiment of FIG. 12 to be discussed subsequently. When transducer elements 36 are driven by a suitable source of power, not illustrated, bearing member 28 vibrates radially. By driving the transducer 36 at the resonant frequency of bearing member 28, a sufficient radial displacement will be established between rod-like bearing member 22 and sleeve-like bearing member 28 to cause the gas in the clearance between the bearing members alternately to be compressed and decompressed and thereby to generate a local supporting force in the squeeze bearing defined between the bearing members. An important feature of the invention is that due to the non-circular perimeter of the bearing members, relative rotation about their common axis is resisted while nearly frictionless relative translation between the bearing members is permitted along this same axis.

In FIG. 3B, an alternate general case of the invention is shown in which rod-like bearing member 22 is hollow and includes a central bore 42 within which a plurality of piezoelectric transducers 44 are mounted on the inside surface of bearing member 22. In this instance, rod-like bearing member 22 preferably is allowed to translate axially while sleeve-like bearing member 28 is fixed on a suitable base 46. By driving transducers 44 at the resonant frequency of bearing member 22, the desired squeeze bearing effect is produced in the manner previously discussed and at the same time, relative rotation between the bearing members is resisted.

Figure 4:
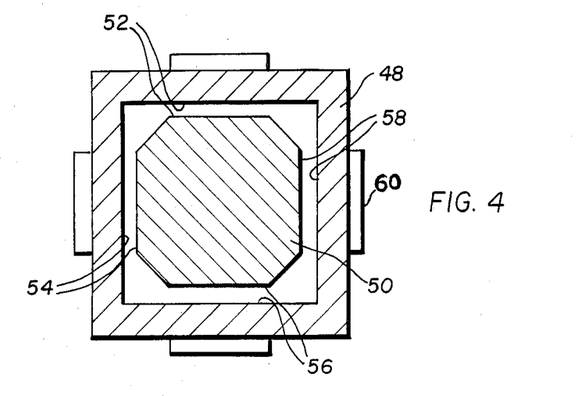
FIG. 4 shows a sectional view of another, general case of a squeeze bearing apparatus according to the invention in which the perimeters of the rod-like and sleeve-like bearing members comprise a plurality of juxtaposed, perimetrically extended pairs of segments having essentially geometrically similar shapes.

In the foregoing examples of general cases of squeeze bearing apparatuses according to the invention, the radial clearance between bearing members 22 and 28 has been shown to be equal all around; however, this arrangement is not required in squeeze bearings according to the invention. FIG. 4 shows a sectional view of a squeeze bearing in which the sleeve-like bearing member 48 has a generally rectangular, in this case square, configuration; whereas, the rod-like bearing member 50 has a roughly octagonal configuration. The interior perimeter of bearing member 48 and the exterior perimeter of bearing member 50 together comprise a plurality of juxtaposed, perimetrically extended pairs 52, 54, 56 and 58 of perimetral segments which have essentially geometrically similar shapes. The transducers 60 are mounted on the exterior surface of sleeve-like bearing member 48 at these same segments where the radial clearance between the two bearing members is more or less uniform. However, among these pairs of segments, the radial clearance between the bearing members can vary substantially. Moreover, the individual pairs of similar perimetral segments need not all have the same geometry, so long as the segments of each pair are geometrically similar.

Figures 5, 6:
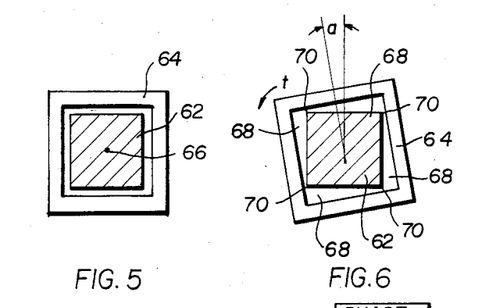
FIGS. 5-7 illustrate schematically a squeeze bearing apparatus according to the invention subject initially to no torsional load, then to some torsional load and finally to an excessive torsional load causing contact between the bearing members.
Figure 7:
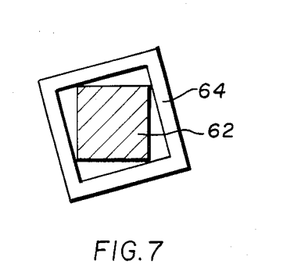

FIGS. 5 to 7 illustrate, in a very simplified manner, the modes of operation of a squeeze bearing apparatus according to the invention which cause it to exhibit improved torsional stiffness. A fixed rod-like bearing member 62 is surrounded by a moveable sleeve-like bearing member 64 so that they share a common axis 66. For simplicity, the transducers which cause relative radial vibration between the bearing members have not been illustrated. In a typical application, the radial clearance between the bearing members would be approximately 0.001 centimeter and the length of the sides of bearing member 62 would be approximately 0.6 centimeter. When relative rotation is experienced between the bearing members due to application of torque during operation, the uniform clearance shown in FIG. 5 changes essentially to the configuration of FIG. 6 where several wedge-shaped volumes 68 are defined between the bearing members. When the clearance is reduced in this manner due to application of a torque t, as indicated at locations 70, an increased bearing force is generated at locations 70 which tends to resist further rotation. Of course, if enough torque is applied, bearing members 62 and 64 can be forced to touch as shown in FIG. 7. In contrast to this unique mode of operation of a squeeze bearing apparatus according to the invention, prior art squeeze bearing apparatuses of the type illustrated in FIG. 1 permit essentially unlimited relative rotation between the bearing members due to their circular perimetral configuration.

Figure 8:
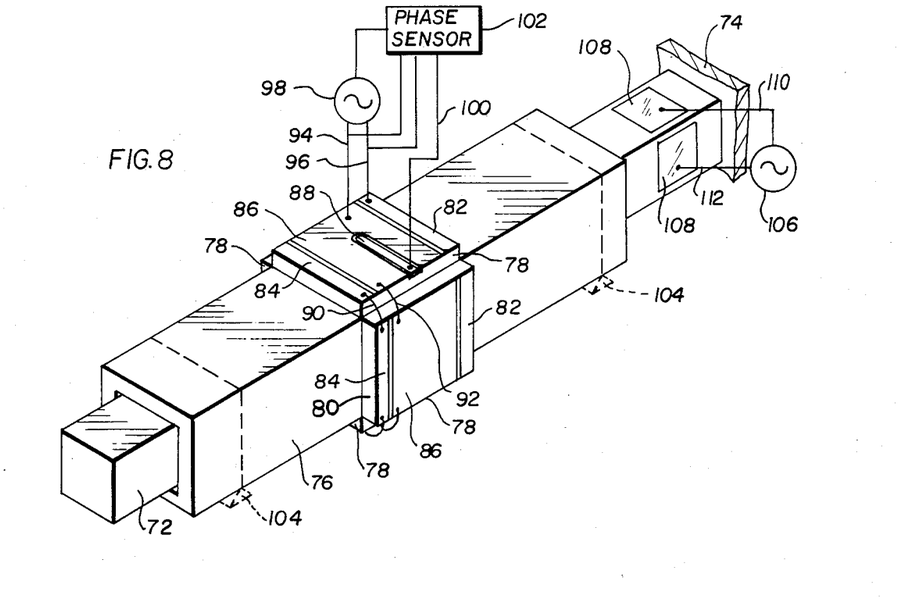
FIG. 8 shows a perspective view of a first embodiment of a squeeze bearing apparatus according to the invention.

FIG. 8 shows a perspective view of a first, preferred embodiment of the invention. A square, rod-like bearing member 72 is provided which may be precision machined or formed from material such as glass, ceramic or stainless steel. The material used for bearing member 72 preferably has a high specific stiffness, a low density and the capability of being machined to a good surface which will allow intermittent contact between the bearing members during start-stop conditions without resulting in undue wear. One end of rod-like bearing member 72 is fixed on a suitable support 74. In one actual embodiment of the invention, bearing member 72 was approximately one centimeter square and had a length sufficient to allow the desired movement of a square, sleeve-like bearing member 76 slidably mounted thereon. Bearing member 76 can be precision machined on its interior surface from a material such as molybdenum, for example. In one actual embodiment of the invention, bearing member 76 was about seven centimeters long, about one centimeter square and about 0.1 centimeter in wall thickness. Preferably, the nominal clearance between the bearing members is about 0.001 centimeter. The surface finish of the exterior of bearing member 76 may be as much as ten times rougher than that of the interior surface without substantially affecting performance. However, if the difference in the interior and exterior surfaces is too great, the reproducability of the vibrational modes of the bearing may be rather poor.

Four PZT transducers 78 are centrally mounted on the exterior sides of bearing member 76 by means such as an epoxy cement. In one actual embodiment of the invention, transducers 78 were approximately two centimeters long, one centimeter wide and 0.08 centimeter thick. Each of transducers 78 is provided with a first electrode 80 which extends across the surface in contact with bearing members 76 and wraps around the ends of transducers 78 to define a pair of lead attachments pads 82, 84 which were about 0.13 centimeter wide in one embodiment. A second electrode 86 is attached to the outer surface of each transducer 78 between lead attachment pads, 82, 84. On one of the transducers 78, a feedback electrode 88 is centrally mounted.

Pairs of conductors 90, 92 interconnect the electrodes of successive transducers 78 around the circumference of bearing member 76. A further pair of conductors 94, 96 connects the electrodes 80, 86 to a suitable source of alternating electrical power 98 which drives the transducer 78 at the resonant frequency of bearing member 76. Although the vibration of transducers 78 causes sufficient relative radial vibration to generate the desired squeeze bearing effect, those skilled in the art will understand that the amplitude and direction of vibration at any given time is not uniform around the perimeter or along the length of the bearing members. A conductor 100 connects feedback electrode 88 to a differential phase sensing circuit 102 which adjusts the frequency of power source 98 so that at resonance the phase of the feedback signal on conductor 100 is 90 degrees from that of the drive signals on conductors 94, 96. A phase-locked loop circuit can keep the bearing at the desired resonant frequency in this manner. Although it is preferred to operate the four transducers 78 at the same resonant frequency, it is also within the scope of the invention to operate them at different frequencies.

Various modifications of the embodiment shown in FIG. 8 are possible. For example, it if is desired to translate bearing member 72 and fix bearing member 76, the sleeve-like bearing member 76 can be mounted at its nodal lines 104, as shown in phantom, and support 74 can be omitted. It is also within the scope of the invention to form rod-like bearing member 72, at least in part, from a piezoelectric material, mounted at its nodal point, not illustrated, and to drive rod-like bearing member 72 using a separate source of alternating electrical power 106 connected to a pair of electrodes 108 on bearing member 72, by means of conductors 110, 112. In such a configuration, rod-like bearing member 72 and sleeve-like bearing member 76 can be operated at different frequencies. Finally, those skilled in the art will appreciate that transducers 78 also may be formed from electrostrictive material rather than piezoelectric material. And, as will be discussed in greater detail subsequently, sleeve-like bearing member 76 preferably will be made from glass.

Figures 9, 10, 11:
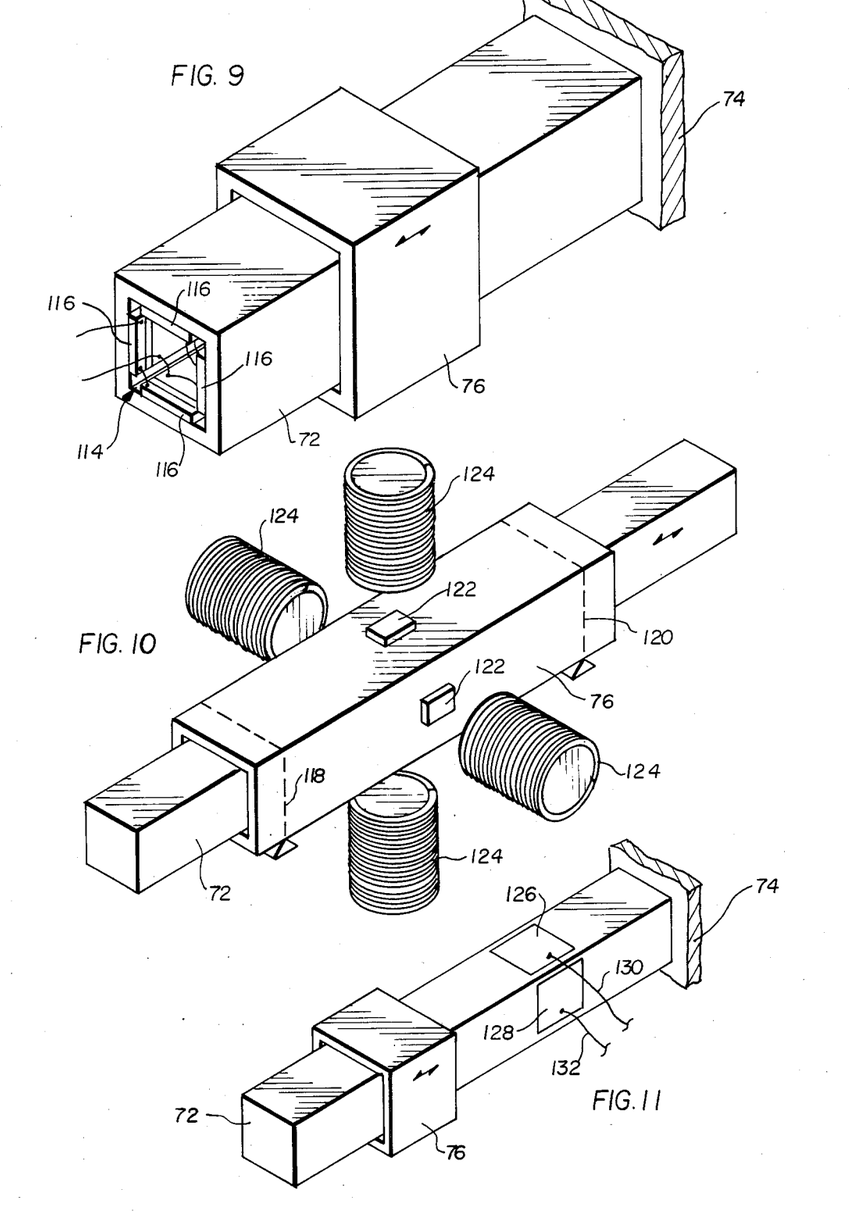
FIG. 9 shows a perspective view of a second embodiment of the invention.
FIG. 10 shows a perspective view of a third embodiment of the invention.
FIG. 11 shows a perspective view of a fourth embodiment of the invention.

FIG. 9 shows a second embodiment of the invention in which rod-like bearing member 72 is hollow and provided with a central, flat sided bore 114 on which four PZT transducers 116 are mounted using a suitable epoxy cement. Transducers 116 may be connected to a suitable power source, not illustrated, and rod-like member 72 preferably is fixed. In this embodiment, bearing member 72 can be made from solid molybdenum which is precision ground on its outside surface. Sleeve-like bearing member 72 may be made from molybdenum, stainless steel or the like which has been precision machined on its inside surface. It is also within the scope of the invention use bender element transducers of the type disclosed in co-pending application Ser. No. 273,280 filed June 12, 1981, by R. A. Scranton for Planar and Cylindrical Pneumatodynamic Bearings. And, as in the embodiment of FIG. 8, electrostrictive transducers may be used as well.

FIG. 10 shows a third, magnetically driven embodiment of the invention. Sleeve-like bearing member 76 is made from a suitable permeable or non-magnetic material and is fixed on mounts at its nodal lines 118, 120 as illustrated schematically. Rod-like bearing member 72 is made from a non-magnetic material and is free to translate. Rather than using piezoelectric or electrostrictive transducers in the manner previously discussed, this embodiment incorporates four plates 122 of magnetic material such as ferrite, soft iron, samarium cobalt or nickel, all bonded to sleeve-like bearing member 76 at the centers of its side surfaces. Alternatively, a magnetostrictive material could be used. As shown schematically, four stationary electromagnets 124 are positioned about sleeve-like bearing member 76, one opposite each of magnetic plates 122. The electrical leads from electromagnets 124, not illustrated, are connected to a suitable source of alternating polarity current to drive sleeve-like bearing member 76 at its resonant frequency.

Figures 12, 13, 14:
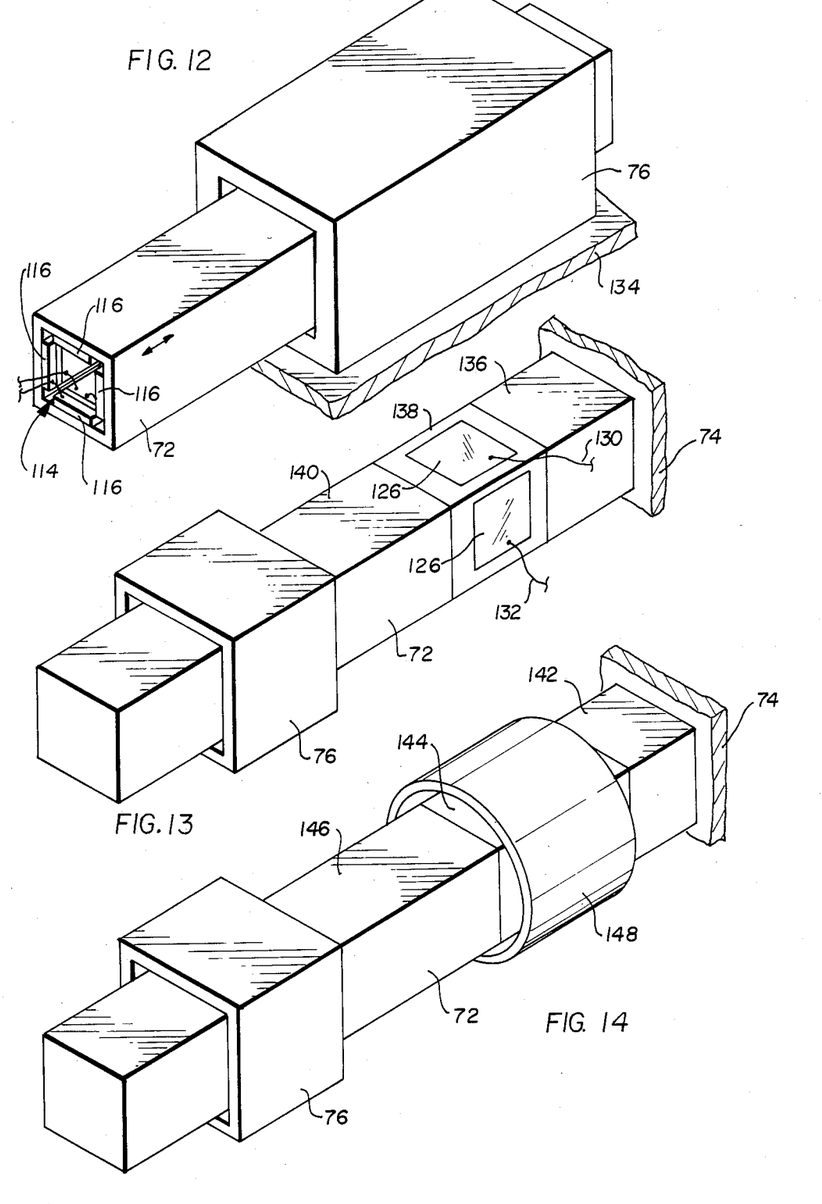
FIG. 12 shows a perspective view of a fifth embodiment of the invention.
FIG. 13 shows a perspective view of a sixth embodiment of the invention.
FIG. 14 shows a perspective view of a seventh embodiment of the invention.

FIG. 11 illustrates a fourth embodiment of the invention in which rod-like bearing member 72 is formed from a solid bar of PZT or electrostrictive material, precision machined on its outer surface. Sleeve-like bearing member 76 may be formed from stainless steel precision machined on its interior surface. In this embodiment, the thickness of rod-like bearing member 72 preferably is approximately one thousand times the clearance between bearing member 72 and bearing member 76. That is, the thickness of bearing member 72 is approximately one centimeter. The squeeze bearing apparatus shown in FIG. 11 is driven by means of a pair of electrodes 126, 128 which are electrically connected by suitable conductors 130, 132 to a source of alternating electrical power, not illustrated. FIG. 12 discloses a fifth embodiment of the invention which is rather similar to that of FIG. 9 except that in this instance sleeve-like bearing member 76 is fixed to a suitable base 134 and rod-like bearing member 72 is allowed to translate.

FIG. 13 discloses a sixth embodiment of the invention which is similar in many respects to that of FIG. 11. However, in this instance rod-like bearing member 72 is fixed and comprises a base portion 136 of glass, ceramic or stainless steel, bonded to a solid central transducer portion 138 of PZT or electrostrictive material, bonded to an outer portion 140 of glass, ceramic or stainless steel. The length of central transducer portion 138 is chosen to provide the desired amplitude of vibration between bearing 72 and 76 without overheating transducer portion 138, as will be understood by those skilled in the art.

FIG. 14 discloses a seventh embodiment of the invention in which rod-like bearing member is fixed and comprises a base portion 142 of glass, ceramic or stainless steel bonded to a solid central transducer portion 144 of magnetostrictive material such nickel, bonded to an outer portion 146 of glass, ceramic or stainless steel. Surrounding magnetostrictive portion 144 is a solenoid type drive coil 148 which is connected to a source of alternating electrical power, not illustrated. When coil 148 is operating, transducer portion 144 is caused to vibrate due to the well known magnetostrictive effect. The length of transducer portion 144 is chosen to produce the desired amplitude of vibration between bearing members 72 and 76 without overheating transducer portion 144.

Figure 15A:
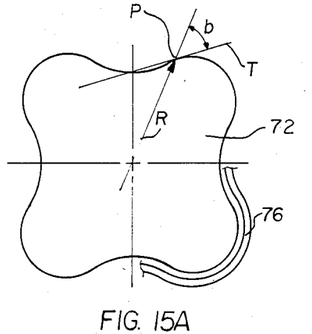
FIG. 15A-15J show examples of cross sectional shapes for bearing members according to the invention.

FIGS. 15A–15J show various other non-circular cross sectional shapes which can be used for the rod-like and sleeve-like bearing members according to the invention. The torsional stiffness of a squeeze bearing apparatus having a given cross sectional or perimetral configuration is influenced by several factors. The resulting stiffness will be the integral or sum of the stiffness for each point along the perimeter of the bearing member, as modified by a geometrical factor related to the effective moment arm. With reference to FIG. 15A, for a certain point P along the perimeter of the bearing member, the factors which influence the torsional stiffness include the local bearing stiffness which is a function of deflection at the point in question and in some neighborhood around this point; the angle b between a radius vector R from the centroid of the cross section to the point in question and a tangent T to the perimeter at this point; and the length of radius vector R.

Figure 15B:
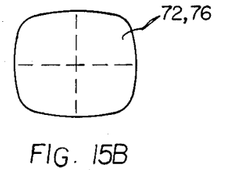
Figure 15C:
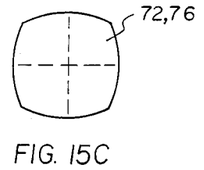
Figure 15D:
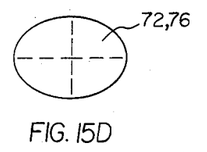
Figure 15E:
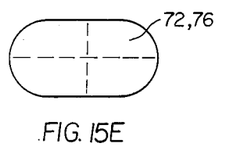
Figure 15F:
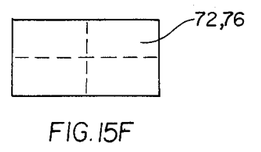
Figure 15G:
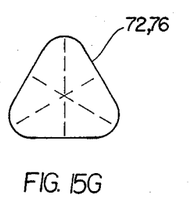
Figure 15H:
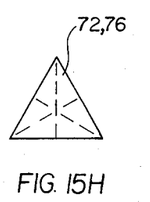
Figure 15I:
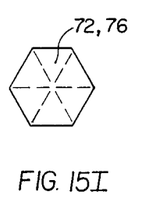
Figure 15J:
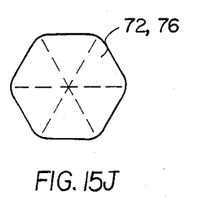

In general, the torsional stiffness of a given cross sectional shape can be shown to decrease where the number of outwardly projecting lobes increases. This is because the cross section behaves more and more like a circular cross section which exhibits no torsional stiffness, as discussed in regard to FIG. 1. In FIGS. 15B and 15C, the cross sections have two axes of symmetry of equal length set at 90 degrees to each other. In FIGS. 15D through 15F, there are two axes of symmetry of unequal length set at 90 degrees to each other. In FIGS. 15G through 15J, the cross sections each have three axes of symmetry which are of equal length.

While FIGS. 15A–15J show a few examples of suitable cross sections, it will be recognized by those persons skilled in the art that there is potentially an infinite number of useful cross sections. The choice of cross sectional geometry to be employed will be dependent upon the ease with which the required surfaces can be generated in a manufacturing environment and the degree of practicality of driving the active squeeze bearing member using piezoelectric or other transducer devices.

A technique useful for making a sleeve-like bearing member from glass, with a variety of interior perimeters, is described in a commonly assigned, copending PCT Application S.N. PCT/US82/01828 filed on Dec. 30, 1982, for Improved Long Tube Bender Squeeze Bearing, the invention of M. B. Caruso and R. A. Scranton. The disclosure of this application is incorporated herein by reference. In accordance with such a technique, a tube of glass is provided having an interior diameter only slightly larger than the maximum transverse dimension of the desired cross sectional configuration. A mandrel of suitable configuration and material is provided. A fixture is provided which supports the tube. Then, the preheated mandrel is inserted into the tube while the tube is held in the fixture. If necessary, a release material may be applied to the exterior surface of the mandrel to ease its subsequent removal. Heat is applied to the tube to heat the glass to its fusion temperature while a vacuum is drawn on the interior of the tube. Then, when the apparatus cools, the mandrel is removed. It is also possible to precisely form the outer surface of a rod-like bearing member by providing a vacuum mold having a smaller coefficient of thermal expansion than the material to be used for rod-like member. For example, a vacuum mold made from Invar could be used to form a rod-like bearing member from glass in whatever configuration desired. A glass rod inserted in such a mold and raised to its fusion temperature would expand into contact with the walls of the mold and, following cooling, would be formed to a geometry exactly matching that the mold walls.

While our invention has been shown and described with reference to particular embodiments thereof those skilled in the art will understand that various other variations in the form and detail of the squeeze bearing apparatus according to the invention may be made without departing from the spirit and scope of the appended claims.

Having thus described our invention in sufficient detail to enable those skilled in the art to make and use it, we claim as new and desired to secure Letters Patent for:

1. An improved squeeze bearing apparatus comprising:
   a rod-like bearing member having an exterior surface with a non-circular exterior perimeter, said perimeter comprising a plurality of outwardly projecting lobes;
   a sleeve-like bearing member for receiving said rod-like bearing member, said sleeve-like bearing member having a non-circular interior bore perimeter symmetrical with said rod-like bearing member exterior perimeter; and
   means for causing sufficient relative radial vibration between said sleeve-like bearing member and said rod-like bearing member to cause fluid in the clearance between said members alternately to be compressed and decompressed and thereby generate a load supporting force which is substantially inversely proportional to the number of said lobes in the squeeze bearing defined between said bearing members to resist relative rotation between said bearing members about said axis due to said compression and decompression of said fluid by said non-circular perimeters and to allow relative translation between said bearing members along said axis.

2. An improved squeeze bearing apparatus according to claim 1, wherein said sleeve-like bearing member is made at least in part from a piezoelectric material and said means for causing comprises a source of alternating electrical power, a plurality of electrodes applied to the piezoelectric portion of said sleeve-like bearing member and means for electrically connecting said source to said electrodes to cause said vibration.

3. An improved squeeze bearing apparatus according to claim 2, in which said rod-like bearing member is fixed and said sleeve-like bearing member is slidable thereon.

4. An improved squeeze bearing apparatus according to claim 1, wherein said rod-like bearing member is made at least in part from a piezoelectric material and said means for causing comprises a source of alternating electrical power, a plurality of electrodes applied to the piezoelectric portion of said rod-like bearing member and means for electrically connecting said source to said electrodes to cause said vibration.

5. An improved squeeze bearing apparatus according to claim 4, in which said sleeve-like bearing member is fixed and said rod-like bearing member is slidable therethrough.

6. An improved squeeze bearing apparatus according to claim 4, in which said rod-like bearing member is fixed and said sleeve-like bearing member is slidable thereon.

7. An improved squeeze bearing apparatus according to claim 1, wherein at least one of said bearing members are made at least in part from piezoelectric material and said means for causing comprises a source of alternating electrical power, a plurality of electrodes applied to each of said bearing members of piezoelectric material and means for electrically connecting said source to said electrodes.

8. An improved squeeze bearing apparatus according to claim 7, wherein said source of alternating electrical power drives said bearing members of piezoelectric material at different frequencies.

9. An improved squeeze bearing apparatus according to claim 1, in which said rod-like bearing perimeter and said sleeve-like bearing perimeter together comprise a plurality of juxtaposed, perimetrally extended pairs of segments having essentially geometrically similar shapes, said relative radial vibration occurring primarily between said segments to generate said load force and resist said relative rotation.

10. An improved squeeze bearing apparatus according to claim 1, in which one of said bearing members is longer than the other, is made at least in part from a piezoelectric material and is fixed relative to the other bearing member.

11. An improved squeeze bearing apparatus according to claim 10, in which said rod-like bearing member is fixed and said sleeve-like bearing member is slidable thereon.

12. An improved squeeze bearing apparatus according to claim 10, in which said sleeve-like bearing member is fixed and said rod-like bearing member is slidable therethrough.

13. An improved squeeze bearing apparatus according to claim 1, wherein said sleeve-like bearing member is fixed and made at least in part from a magnetic material; said means for causing comprises a source of alternating magnetic force for causing said sleeve-like bearing member to vibrate; and said rod-like bearing member is slidable through said sleeve-like bearing member.

14. An improved squeeze bearing apparatus according to claim 1, wherein said rod-like bearing member is fixed and formed at least in part from a magnetostrictive material; said means for causing comprises a source of alternating magnetic force for causing said rod-like bearing member to vibrate; and said sleeve-like bearing member is slidable on said rod-like bearing member.

15. An improved squeeze bearing apparatus according to claim 14, wherein said rod-like bearing member comprises a first portion of magnetostrictive material and a second, outer portion attached to said first portion; and said sleeve-like bearing member is slidable on said outer portion of said rod-like bearing member.

16. An improved squeeze bearing apparatus according to claim 1, wherein said rod-like bearing member is fixed and formed from a solid piece piezoelectric material; said means for causing comprises a source of alternating electrical power, a plurality of electrodes applied to said rod-like bearing member and means for electrically connecting said electrodes to said source to cause said vibration; and said sleeve-like bearing member is slidable on said rod-like bearing member.

17. An improved squeeze bearing apparatus according to claim 1, wherein said rod-like bearing member is fixed and comprises a first portion of solid piezoelectric material and a second portion of non-piezoelectric material attached to said first portion; said means for causing comprises a source of alternating electrical power, a plurality of electrodes applied to said first portion and means for electrically connecting said electrodes to said source to cause said vibration; and said sleeve-like bearing member is slidable on said outer portion of said rod-like bearing member.

18. An improved squeeze bearing apparatus according to claim 1, in which said interior bore and said exterior surface are at least partially cylindrical.

19. An improved squeeze bearing apparatus according to claim 1, wherein said rod-like and sleeve-like non-circular perimeters are square.

20. An improved squeeze bearing apparatus according to claim 1, wherein said sleeve-like bearing member is made at least in part from an electrostrictive material and said means for causing comprises a source of alternating electrical power, a plurality of electrodes applied to the electrostrictive portion of said sleeve-like bearing member and means for electrically connecting said source to said electrodes to cause said vibration.

21. An improved squeeze bearing apparatus according to claim 20, in which said rod-like bearing member is fixed and said sleeve-like bearing member is slidable thereon.

22. An improved squeeze bearing apparatus according to claim 1, wherein said rod-like bearing member is made at least in part from a electrostrictive material and said means for causing comprises a source of alternating electrical power, a plurality of electrodes applied to the electrostrictive portion of said rod-like bearing member and means for electrically connecting said source to said electrodes to cause said vibration.

23. An improved squeeze bearing apparatus according to claim 22, in which said sleeve-like bearing member is fixed and said rod-like bearing member is slidable therethrough.

24. An improved squeeze bearing apparatus according to claim 22, in which said rod-like bearing member is fixed and said sleeve-like bearing member is slidable thereon.

25. An improved squeeze bearing apparatus according to claim 1, wherein said bearing members are made at least in part from an electrostrictive material and said means for causing comprises a source of alternating electrical power, a plurality of electrodes applied to each of said bearing members and means for electrically connecting said source to said electrodes.

26. An improved squeeze bearing apparatus according to claim 25, wherein said source of alternating electrical power drives said bearing members at different frequencies.

27. An improved squeeze bearing apparatus according to claim 1, in which one of said bearing members is longer than the other, is made at least in part from an electrostrictive material and is fixed relative to the other bearing member.

28. An improved squeeze bearing apparatus according to claim 27, in which said rod-like bearing member is fixed and said sleeve-like bearing member is slidable thereon.

29. An improved squeeze bearing apparatus according to claim 27, in which said sleeve-like bearing member is fixed and said rod-like bearing member is slidable therethrough.

30. An improved squeeze bearing apparatus according to claim 1, wherein said rod-like bearing member is fixed and formed from a solid piece electrostrictive material; said means for causing comprises a source of alternating electrical power, a plurality of electrodes applied to said rod-like bearing member and means for electrically connecting said electrodes to said source to cause said vibration; and said sleeve-like bearing member is slidable on said rod-like bearing member.

31. An improved squeeze bearing apparatus according to claim 1, wherein said rod-like bearing member is fixed and comprises a first portion of solid electrostrictive material and a second portion of non-electrostrictive material attached to said first portion; said means for causing comprises a source of alternating electrical power, a plurality of electrodes applied to said first portion and means for electrically connecting said electrodes to said source to cause said vibration; and said sleeve-like bearing member is slidable on said outer portion of said rod-like bearing member.

32. An improved squeeze bearing apparatus according to claim 1, in which said rod-like and sleeve-like non-circular perimeters are symmetric relative to a plane passing through said axis.

33. An improved squeeze bearing apparatus according to claim 32, in which said first and second non-circular perimeters are symmetric relative to a second plane passing through said axis.

34. An improved squeeze bearing apparatus according to claim 33, in which said first and second planes intersect said non-circular perimeters on chords of equal length.

35. An improved squeeze bearing apparatus according to claim 33, in which said first and second planes are normal to each other.

36. An improved squeeze bearing apparatus according to claim 35, in which said first and second planes intersect said non-circular perimeters on chords of equal length.

37. An improved squeeze bearing apparatus according to claim 33, in which said rod-like and rod-like non-circular perimeters are symmetrical relative to a third plane passing through said axis.

38. A sleeve bearing apparatus for providing a fluid support comprising:
 a sleeve-like bearing member having an interior bore with a first non-circular interior perimeter comprising a plurality of lobes and an axis extending through said bore; and
 a rod-like bearing member having a plurality of lobes on its perimeter symmetrical with said sleeve-like bearing lobes, extending through said interior bore, and spaced apart therefrom to provide a fluid interface with said sleeve-like bearing member;
 said non-circular interior perimeter lobes permitting said fluid interface to constrain relative rotation of said rod-like and sleeve-like bearing members due to the compression and decompression of said fluid interface which generates a restraining force substantially inversely proportional to the number of said lobes.

39. The sleeve bearing apparatus of claim 38 wherein at least one of said bearing members is glass.

* * * * *

UNITED STATES PATENT AND TRADEMARK OFFICE
CERTIFICATE OF CORRECTION

PATENT NO.  : 4,630,941
DATED       : December 23, 1986
INVENTOR(S) : Chainer et al It is certified that error appears in the above-identified patent and that said Letters Patent is hereby corrected as shown below:

In column 14, claim 37, line 2 should read:

--ing to claim 33, in which said rod-like and sleeve-like --.

Signed and Sealed this

First Day of December, 1987

Attest:

DONALD J. QUIGG

*Attesting Officer*   *Commissioner of Patents and Trademarks*